United States Patent
McLain et al.

(10) Patent No.: US 8,416,053 B2
(45) Date of Patent: Apr. 9, 2013

(54) INTERMITTENT SENSOR DETECTION USING SIGNAL STRING LENGTH

(75) Inventors: Kurt D. McLain, Clarkston, MI (US); Layne K. Wiggins, Plymouth, MI (US); Wenbo Wang, Novi, MI (US)

(73) Assignee: GM Global Technology Operations LLC

( * ) Notice: Subject to any disclaimer, the term of this patent is extended or adjusted under 35 U.S.C. 154(b) by 935 days.

(21) Appl. No.: 12/436,408

(22) Filed: May 6, 2009

(65) Prior Publication Data
US 2010/0283572 A1     Nov. 11, 2010

(51) Int. Cl.
 *G05B 23/02*   (2006.01)
(52) U.S. Cl.
 USPC .......... 340/3.1; 340/506; 340/870.1; 702/115
(58) Field of Classification Search .................. 340/1.1, 340/3.1
See application file for complete search history.

(56) References Cited

U.S. PATENT DOCUMENTS

| | | | | |
|---|---|---|---|---|
| 3,645,240 | A * | 2/1972 | Monpetit | 123/483 |
| 6,347,289 | B1 * | 2/2002 | VanderLeest | 702/115 |

\* cited by examiner

*Primary Examiner* — Brian Zimmerman
*Assistant Examiner* — Sara Samson

(57) ABSTRACT

An engine control system comprises a signal deviation module, a variation determination module, and a sensor diagnostic module. The signal deviation module receives a signal from a sensor monitoring an operating condition of an engine and determines a plurality of signal deviations. Each of the plurality of signal deviations is based on a magnitude of a difference between the signal at a first time and the signal at a second time. The second time is different than the first time. The variation determination module generates a variation value based on the plurality of signal deviations during a period. The sensor diagnostic module determines a state of the sensor based on the variation value.

14 Claims, 3 Drawing Sheets

INTERMITTENT SENSOR DETECTION USING SIGNAL STRING LENGTH

FIELD

The present disclosure relates to diagnosis of a sensor, and more particularly to diagnosis of a sensor using signal string length.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A variety of sensors may be used to sense various operating conditions associated with an engine system. The sensors provide signals based on the operating conditions to an engine control module (ECM). For example, an intake air temperature (IAT) sensor senses a temperature of intake air entering an engine. A humidity sensor senses humidity of the intake air. A barometric pressure (BP) sensor senses a barometric pressure of the atmosphere.

Each sensor may generate a signal based on the operating condition and send the signal to the ECM. The ECM may sample the signal and convert the signal into units such as temperature, humidity, and pressure. The ECM may use the signals to make control decisions for the engine system.

SUMMARY

An engine control system comprises a signal deviation module, a variation determination module, and a sensor diagnostic module. The signal deviation module receives a signal from a sensor monitoring an operating condition of an engine and determines a plurality of signal deviations. Each of the plurality of signal deviations is based on a magnitude of a difference between the signal at a first time and the signal at a second time. The second time is different than the first time. The variation determination module generates a variation value based on the plurality of signal deviations during a period. The sensor diagnostic module determines a state of the sensor based on the variation value.

In other features, the variation determination module generates the variation value based on a sum of the plurality of signal deviations. In still other features, the variation determination module generates the variation value based on an average of the plurality of signal deviations.

In still other features, the sensor diagnostic module determines an intermittent sensor state when the variation value is greater than or equal to a fault threshold. The variation determination module determines the period based on at least one of a predetermined diagnostic time and a predetermined number of signal deviations. In other features, the first time and the second time include consecutive times based on a predetermined sampling rate. In still other features, the sensor is selected from a group of engine sensors comprising a temperature sensor, a humidity sensor, and a pressure sensor.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
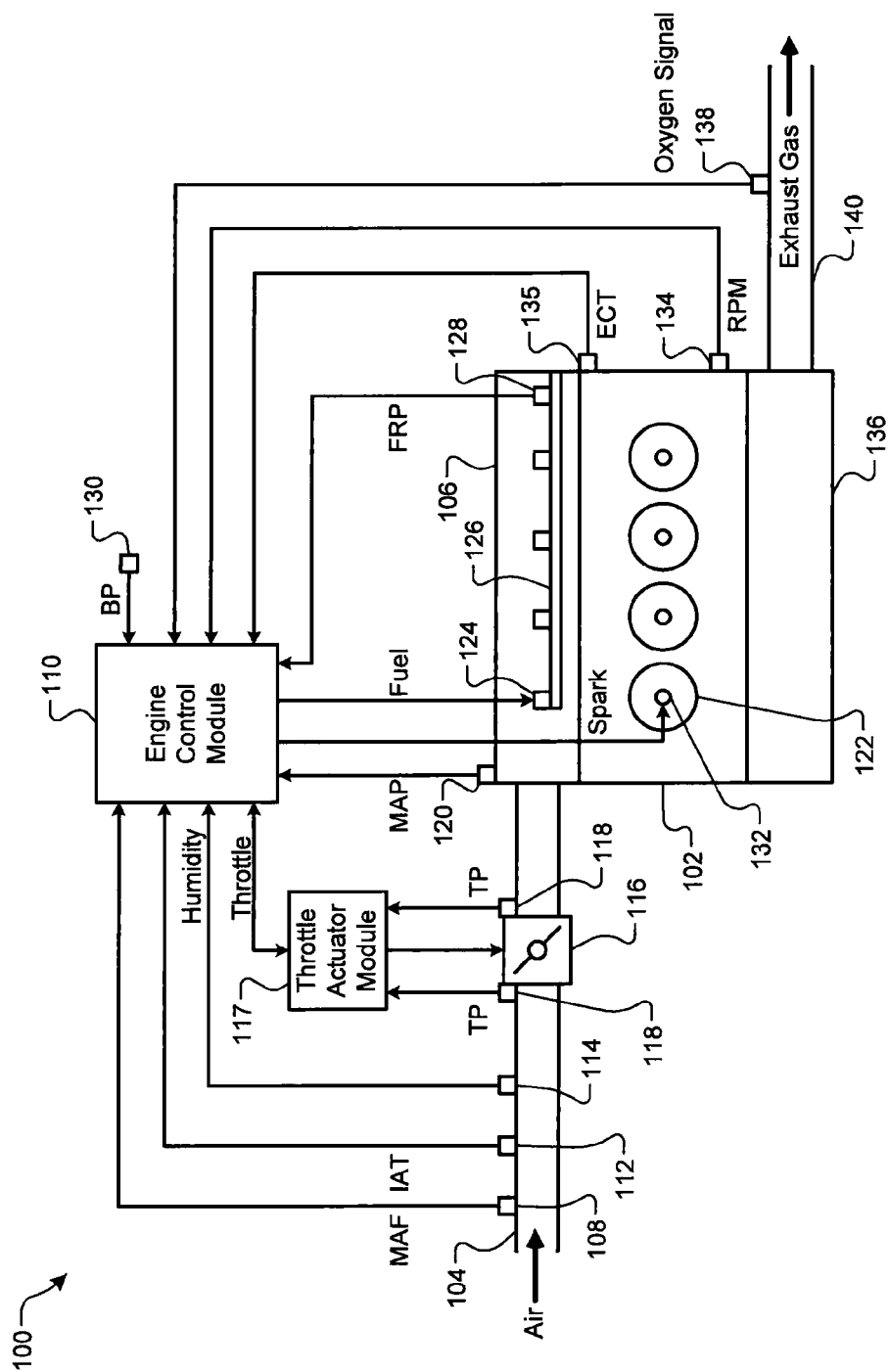
FIG. 1 is a functional block diagram of an engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The sensor signal may be corrupted, and for example, send an intermittent signal to the ECM. The intermittent signal may be the result of a malfunctioning sensor, a faulty connection from the sensor to the ECM, or another electrical malfunction. The intermittent signal may vary between samples by the ECM. The intermittent signal may affect control of the engine system.

The intermittent signal may be diagnosed based on samples of the signal at different times. A signal deviation may be determined based on a magnitude of a difference between a sample of the signal at a first time and a sample of the signal at a second time. A plurality of signal deviations may be determined during a predetermined period. A variation value may be determined based on the plurality of signal deviations. The variation value may be a sum of the plurality of signal deviations. The variation value may be an average of the plurality of signal deviations. A sensor diagnostic module may determine a state of the sensor based on the variation value.

Referring now to FIG. 1, an exemplary implementation of an internal combustion engine system 100 is shown. Air enters an engine 102 through an air inlet 104 and travels to an intake manifold 106. A mass airflow (MAF) sensor 108 may be disposed in the inlet 104. The MAF sensor 108 generates a MAF signal based on a mass of the air entering the engine 102 and sends the MAF signal to an engine control module (ECM) 110. An intake air temperature (IAT) sensor 112 may also be disposed in the inlet 104. The IAT sensor 112 generates an IAT signal based on a temperature of the air and sends the IAT signal to the ECM 110. A humidity sensor 114 generates a humidity signal based on humidity of the air and sends the humidity signal to the ECM 110.

A throttle 116 includes a plate that may be positioned by a throttle actuator module 117 to control the air entering the intake manifold 106. The ECM 110 may generate a throttle signal to control the throttle actuator module 117 based on a desired torque of the engine 102. Throttle position (TP) sensors 118 generate TP signals based on a position of the plate and send the TP signals to the throttle position module 117. A manifold absolute pressure (MAP) sensor 120 generates a MAP signal based on a pressure inside the intake manifold 106 and sends the MAP signal to the ECM 110.

The intake manifold 106 distributes the air to cylinders 122. A fuel injector 124 may inject a mass of fuel into the intake manifold 106 at a central location or at multiple locations. Alternatively, the fuel injector 124 may inject fuel directly into the cylinders 122. In a gasoline engine, the fuel mass may be based on the airflow signal generated by the MAF sensor 108. The air and fuel mix inside the cylinder 122 to create an air/fuel mixture.

The fuel may be provided to the fuel injector 124 by a fuel rail 126. A fuel rail pressure (FRP) sensor 128 generates a FRP signal based on a fuel pressure inside the fuel rail 126 and sends the FRP signal to the ECM 110. A barometric pressure (BP) sensor 130 may be disposed on the ECM 110. The BP sensor 130 generates a BP signal based on a barometric pressure surrounding the engine system 100 and sends the BP signal to the ECM 110.

Pistons (not shown) within the cylinders 122 compress the air/fuel mixture. In a gasoline engine, a spark plug 132 may ignite the air/fuel mixture. In a diesel or compression ignition engine, the air/fuel mixture may be ignited by compression in the cylinder 122. The principles of the present disclosure may be applied to both gasoline and diesel engines.

The combustion of the air/fuel mixture increases the pressure in the cylinder 122 and forces a piston (not shown) to rotate a crankshaft (not shown) in the engine. An engine speed sensor 134 generates a revolutions per minute (RPM) signal based on a position of the crankshaft and sends the RPM signal to the ECM 110. An engine coolant (ECT) sensor 135 generates an ECT signal based on a temperature of a coolant circulating through the engine 102 and sends the ECT signal to the ECM 110.

The combustion of the air/fuel mixture produces exhaust gas that exits the cylinders 122 through an exhaust manifold 136. The exhaust gas may include an amount of oxygen. An oxygen sensor 138 may be disposed in an exhaust pipe 140 to measure the oxygen amount. The oxygen sensor 138 generates an oxygen signal based on the amount of oxygen and sends the oxygen signal to the ECM 110.

The ECM 110 may receive signals from the MAF sensor 108, the IAT sensor 112, the humidity sensor 114, the throttle actuator module 117 and/or the TP sensors 118, the MAP sensor 120, the FRP sensor 128, the BP sensor 130, the engine speed sensor 134, the ECT sensor 135, and the oxygen sensor 138. The signals may include pulse modulated data, a voltage, or a frequency. The ECM 110 may sample the signals and convert the signals into units such as temperature, humidity, and pressure. The ECM 110 may sample the signals at various sampling rates that may depend on an internal clock frequency of the ECM 110.

The ECM 110 may control the spark plugs 132, fuel injectors 124, and throttle 116 based on the signals. An intermittent signal from one or more of the above mentioned sensors may be diagnosed by the ECM 110. An intermittent signal may disrupt the control of the engine 102. For example only, the ECM 110 may determine to control the spark plugs 132, fuel injectors 124, and throttle 116 using other signals and/or modeled values when an intermittent signal is present.

Figure 2:
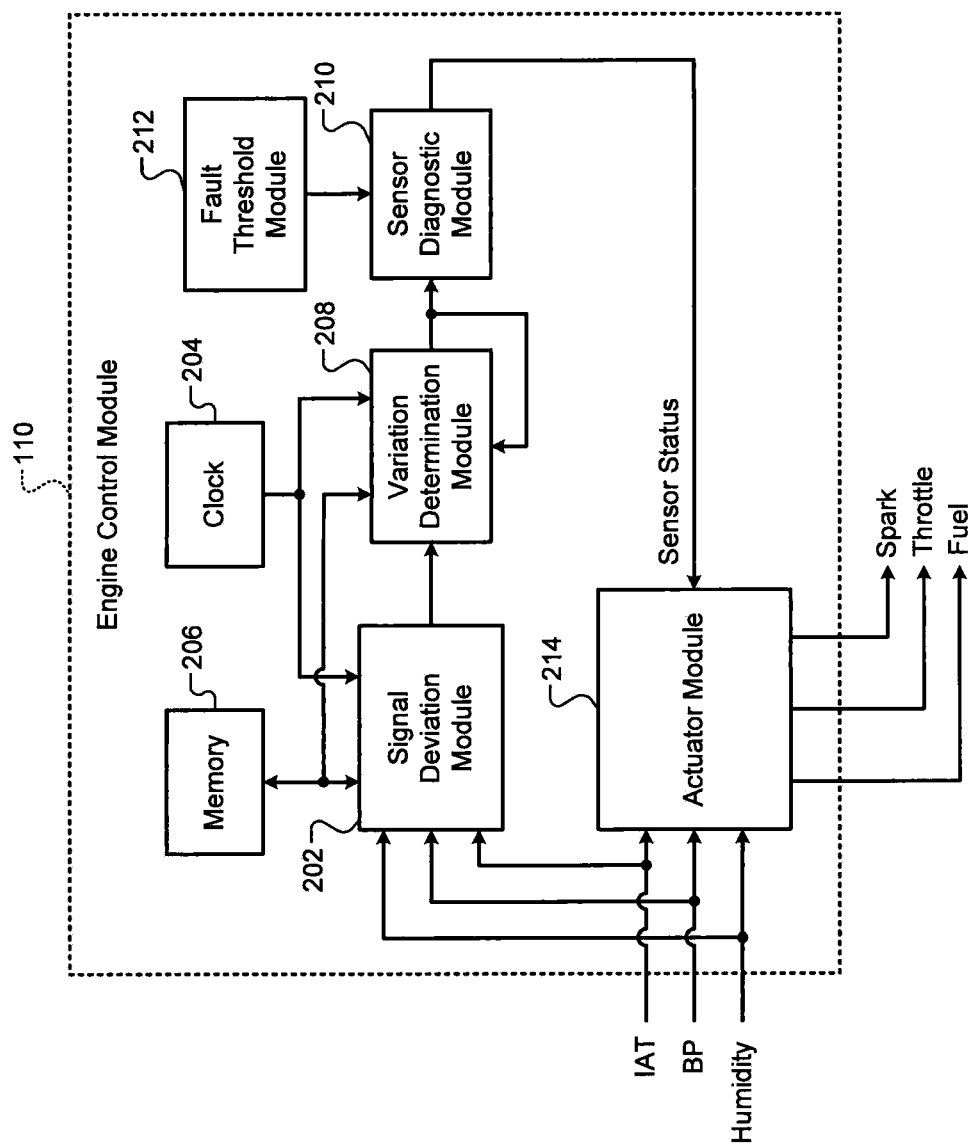
FIG. 2 is a functional block diagram of an exemplary engine control module according to the principles of the present disclosure.

Referring now to FIG. 2, an exemplary implementation of the engine control module 110 is shown. A signal deviation module 202 receives a signal from a sensor and generates a deviation value based on the signal. In FIG. 2, multiple signals are depicted including the IAT signal, BP signal, and humidity signal. The signal deviation module 202 may receive the signal from any of the sensors described herein. For ease of discussion, the IAT signal is described in detail.

The signal deviation module 202 may sample the IAT signal at a first time and may sample the IAT signal at a second time. The samples may occur at different times. The samples may be consecutive samples in a plurality of samples performed at a predetermined sampling rate. The predetermined sampling rate may be based on a clock cycle generated by a clock 204. The sampling rate may be different for each sensor. For example, the oxygen sensor 138 may output a signal that varies more quickly than the IAT sensor 112. Samples of the oxygen signal may occur at a faster sampling rate than that of the IAT sensor. The samples may be stored in memory 206.

The signal deviation module 202 may determine a difference between the samples after each signal is sampled. The signal deviation module 202 may determine a signal deviation for each of the differences based on the magnitude of the difference between the samples. The signal deviation module 202 may determine a plurality of signal deviations during a period. Each signal deviation may be stored in memory 206.

A variation determination module 208 determines a variation value based on the plurality of signal deviations. For example, the variation value may be a sum of the plurality of signal deviations. The variation value may be an average of the plurality of signal deviations. The variation determination module 208 may store the variation value in memory 206.

Initially, the variation value may be set to a value of zero. After the first and the second samples, a first signal deviation may be determined based on the magnitude of the difference between the first and the second samples. The variation value may be increased by the signal deviation and stored in memory 206. After a third sample, a second deviation value may be determined based on the magnitude of the difference between the second and the third samples. The variation value may be increased again by the signal deviation and stored in the memory 206.

The variation value may continue to be increased until a predetermined number of samples have been performed. When the number of samples is greater than the predetermined number of samples, the variation value may be re-set to a value of zero.

The variation value may continue to be increased until a predetermined diagnosis time has elapsed. The clock 204 may initialize a timer that increments based on the clock cycle. When the timer value is greater than or equal to the predetermined diagnosis time, the variation value may be re-set to a value of zero.

The variation value may be based on a predetermined total number of signal deviations. For example only, the variation value may be a rolling sum and/or average of the predetermined total number of signal deviations such as ten. When an eleventh signal deviation is determined, the first signal deviation may be removed from the variation value determination.

A sensor diagnostic module 210 determines a state of the sensor based on the variation value and a sensor fault threshold. The sensor fault threshold may be a calibrateable value generated by a fault threshold module 212. For example only, when the variation value is greater than or equal to the sensor fault threshold, the sensor diagnostic module 210 may indicate a failure state of the sensor. The failure state may be an intermittent sensor signal.

An actuator module 214 may determine actuator values for the fuel injector 124, throttle 116, and spark plug 132. The actuator module 214 may receive sensor states for various sensors and may determine the actuator values based on the sensor states. For example only, when the BP sensor state indicates an intermittent BP sensor, the actuator module 214 may not use the BP signal to determine the actuator values.

Figure 3:
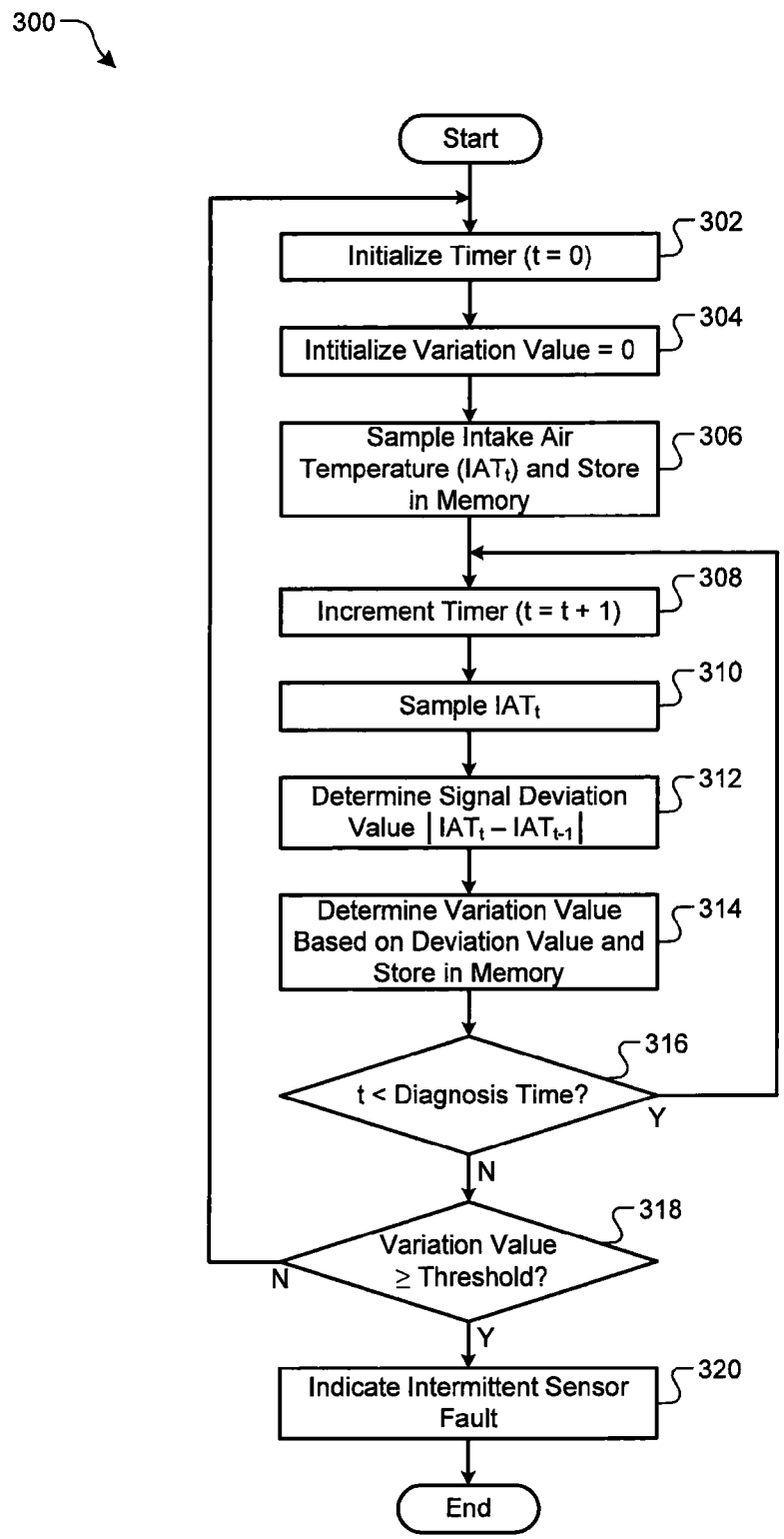
FIG. 3 is a flowchart depicting exemplary steps performed in the engine control module.

Referring now to FIG. 3, a flowchart 300 depicts exemplary steps of an engine control system. Control begins in step 302 where a timer (t) is initialized based on the clock 204. The variation value is initialized to a value of zero in step 304. In step 306, the signal deviation module 202 performs the first sample of a signal at a first time and stores the sample in memory. In FIG. 3, the signal is depicted as the IAT signal from the IAT sensor 112. The signal deviation module 202 may receive a signal from any of the sensors described herein including the BP signal and the humidity signal.

Control continues in step 308 where the timer (t) is incremented based on the clock cycle. In step 310, control performs the second sample of the signal. Control generates the deviation value by determining the magnitude of the difference between the first sample and the second sample in step 312.

In step 314, control determines the variation value based on the deviation value. Control may store the variation value in memory. In step 316, control determines whether the timer value (t) is less than the predetermined diagnosis time. While the timer value (t) is less than the predetermined diagnosis time, control may sample the signal again by returning to step 308. Otherwise, control continues to step 318. In step 318, control diagnoses the sensor based on the variation value and the predetermined variation threshold. When the variation value is greater than or equal to the predetermined variation threshold, control indicates the sensor state in step 320. The state may be the intermittent signal failure. Otherwise, control returns to step 302. Control may continue to increase the variation value while the timer value is less than the predetermined diagnosis time.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
a signal deviation module that receives a signal from a sensor monitoring an operating condition of an engine, and that determines a first signal deviation and a second signal deviation, wherein the first signal deviation is based on a magnitude of a difference between the signal at a first time and the signal at a second time, wherein the second time follows the first time and is different than the first time, and wherein the second signal deviation is based on a magnitude of a difference between the signal at the second time and the signal at a third time, wherein the third time follows the second time and is different than the second time;
a variation determination module that generates a variation value based on a sum of the first signal deviation and the second signal deviation; and
a sensor diagnostic module that determines a state of the sensor based on the variation value.

2. The engine control system of claim 1, wherein the variation determination module generates the variation value based on a sum of the first signal deviation and the second signal deviation.

3. The engine control system of claim 1, wherein the variation determination module generates the variation value based on an average of the first signal deviation and the second signal deviation.

4. The engine control system of claim 1, wherein the sensor diagnostic module determines an intermittent sensor state when the variation value is greater than or equal to a fault threshold.

5. The engine control system of claim 1, wherein the variation determination module generates the variation value based on a plurality of signal deviations during a period, and the period is based on at least one of a predetermined diagnostic time and a predetermined number of signal deviations.

6. The engine control system of claim 1, wherein the first time and the second time include consecutive times based on a predetermined sampling rate.

7. The engine control system of claim 1, wherein the sensor is selected from a group of engine sensors comprising a temperature sensor, a humidity sensor, and a pressure sensor.

8. A method comprising:
receiving a signal from a sensor monitoring an operating condition of an engine and determining a first signal deviation and a second signal deviation, wherein the first signal deviation is based on a magnitude of a difference between the signal at a first time and the signal at a second time, wherein the second time follows the first time and is different than the first time, and wherein the second signal deviation is based on a magnitude of a difference between the signal at the second time and the signal at a third time, wherein the third time follows the second time and is different than the second time;
generating a variation value based on a sum of the first signal deviation and the second signal deviation; and
determining a state of the sensor based on the variation value.

9. The method of claim 8, further comprising generating the variation value based on a sum of the first signal deviation and the second signal deviation.

10. The method of claim 8, further comprising generating the variation value based on an average of the first signal deviation and the second signal deviation.

11. The method of claim 8, further comprising determining an intermittent sensor state when the variation value is greater than or equal to a fault threshold.

12. The method of claim 8, further comprising generating the variation value based on a plurality of signal deviations during a period, and determining the period based on at least one of a predetermined diagnostic time and a predetermined number of signal deviations.

13. The method of claim 8, wherein the first time and the second time include consecutive times based on a predetermined sampling rate.

14. The method of claim 8, wherein the sensor is selected from a group of engine sensors comprising a temperature sensor, a humidity sensor, and a pressure sensor.

* * * * *